Aug. 5, 1941.　　　C. S. ASH　　　2,251,539
DUAL WHEELED VEHICLE
Filed March 19, 1940　　　3 Sheets-Sheet 1

INVENTOR
Charles S. Ash
BY
Morgan Finnegan & Durham
ATTORNEYS

Aug. 5, 1941.  C. S. ASH  2,251,539
DUAL WHEELED VEHICLE
Filed March 19, 1940  3 Sheets-Sheet 2

INVENTOR
Charles S. Ash
BY
Morgan Finnegan & Durham
ATTORNEYS

Aug. 5, 1941.                C. S. ASH                 2,251,539
                         DUAL WHEELED VEHICLE
                     Filed March 19, 1940          3 Sheets-Sheet 3
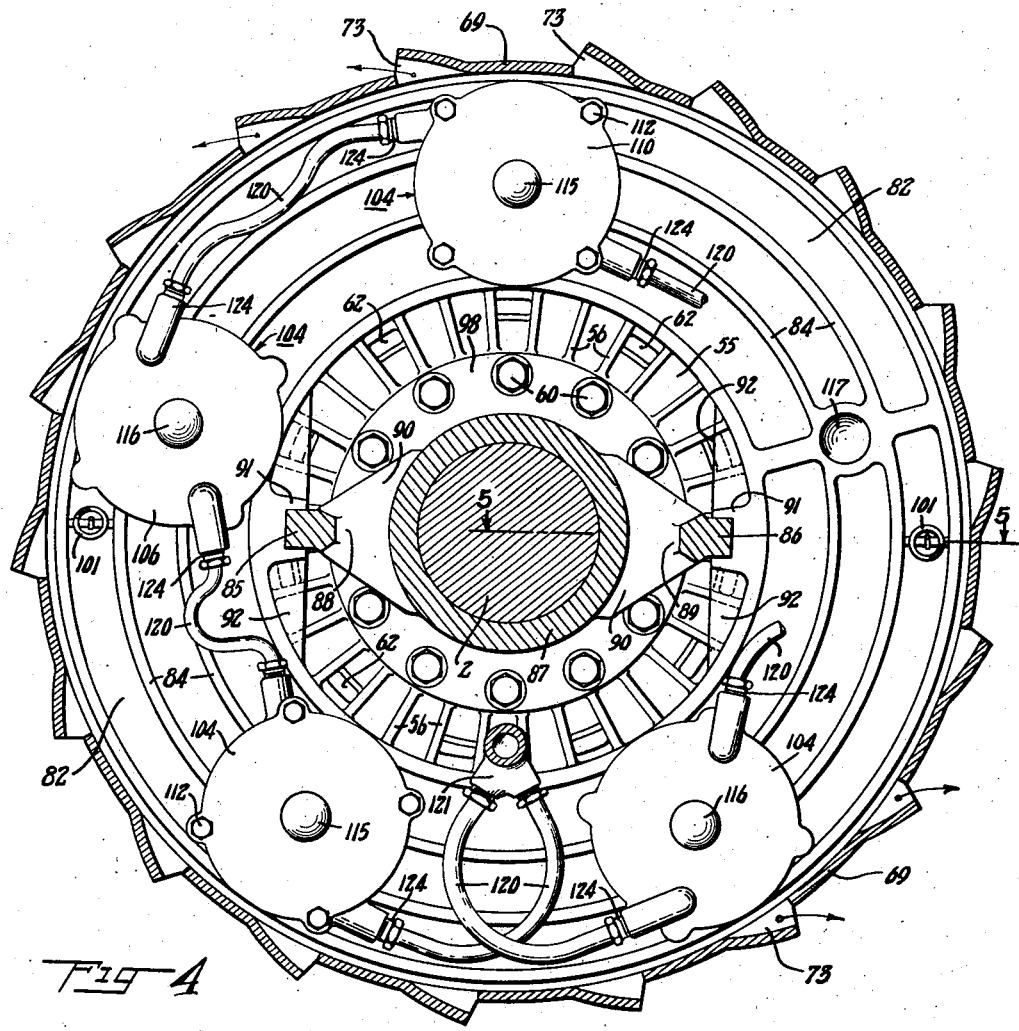
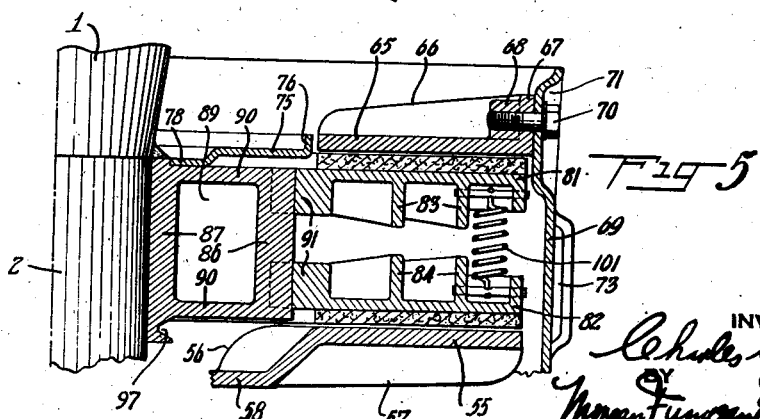

Patented Aug. 5, 1941

2,251,539

UNITED STATES PATENT OFFICE 2,251,539

DUAL WHEELED VEHICLE

Charles S. Ash, Milford, Mich.

Application March 19, 1940, Serial No. 324,750

13 Claims. (Cl. 188—18)

The invention relates to new and useful improvements in dual wheel assemblies for motor vehicles, and more particularly to improved pressure fluid operated braking means especially applicable to dual wheel assemblies.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 4 is a section taken along the line 4—4 of Fig. 1 showing details of the brake-cooling and brake actuating mechanism;

Fig. 5 is a section taken along the line 5—5 of Fig. 4.

Figure 1:
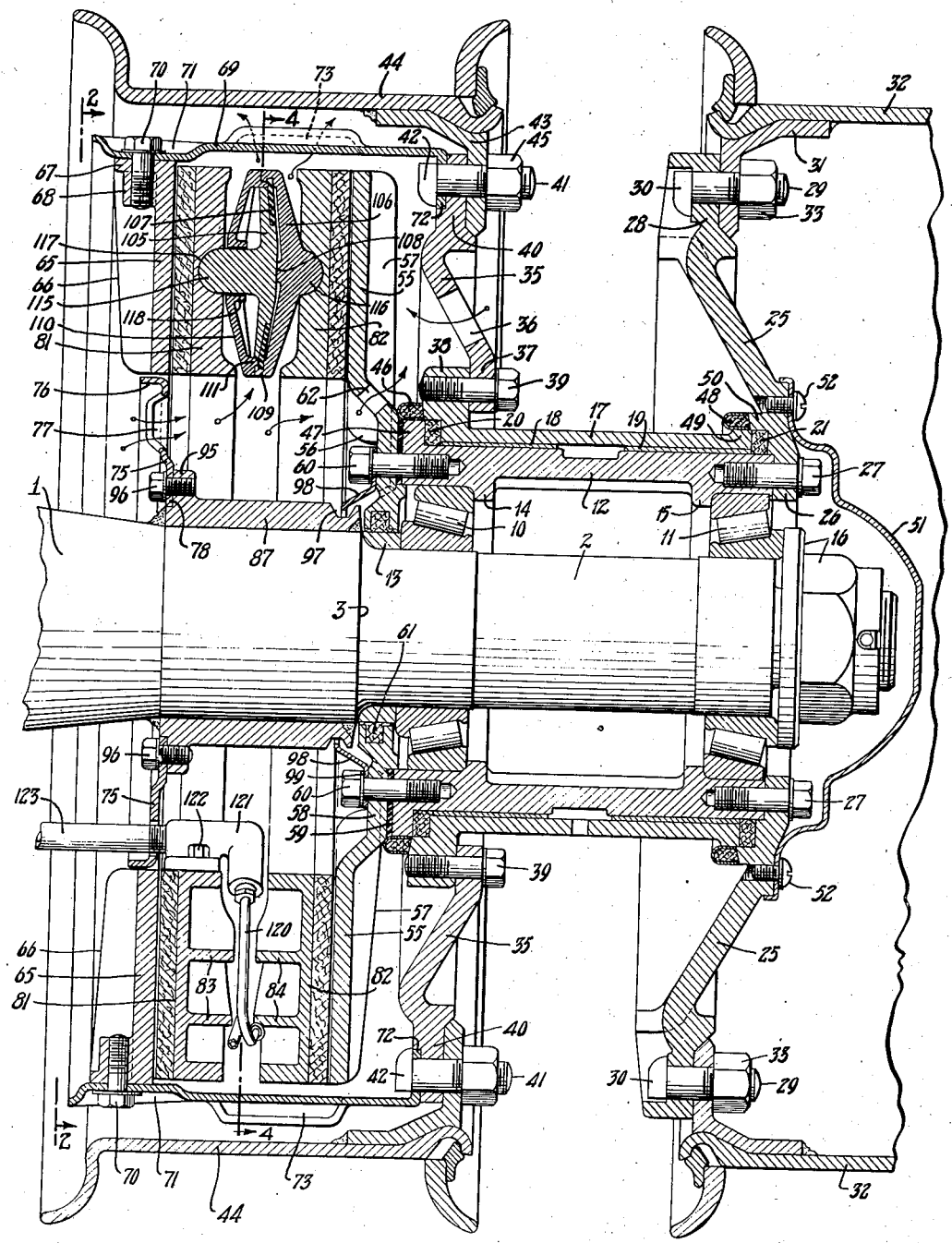
Fig. 1 is a vertical transverse section through a wheel assembly embodying the invention.
Figure 2:
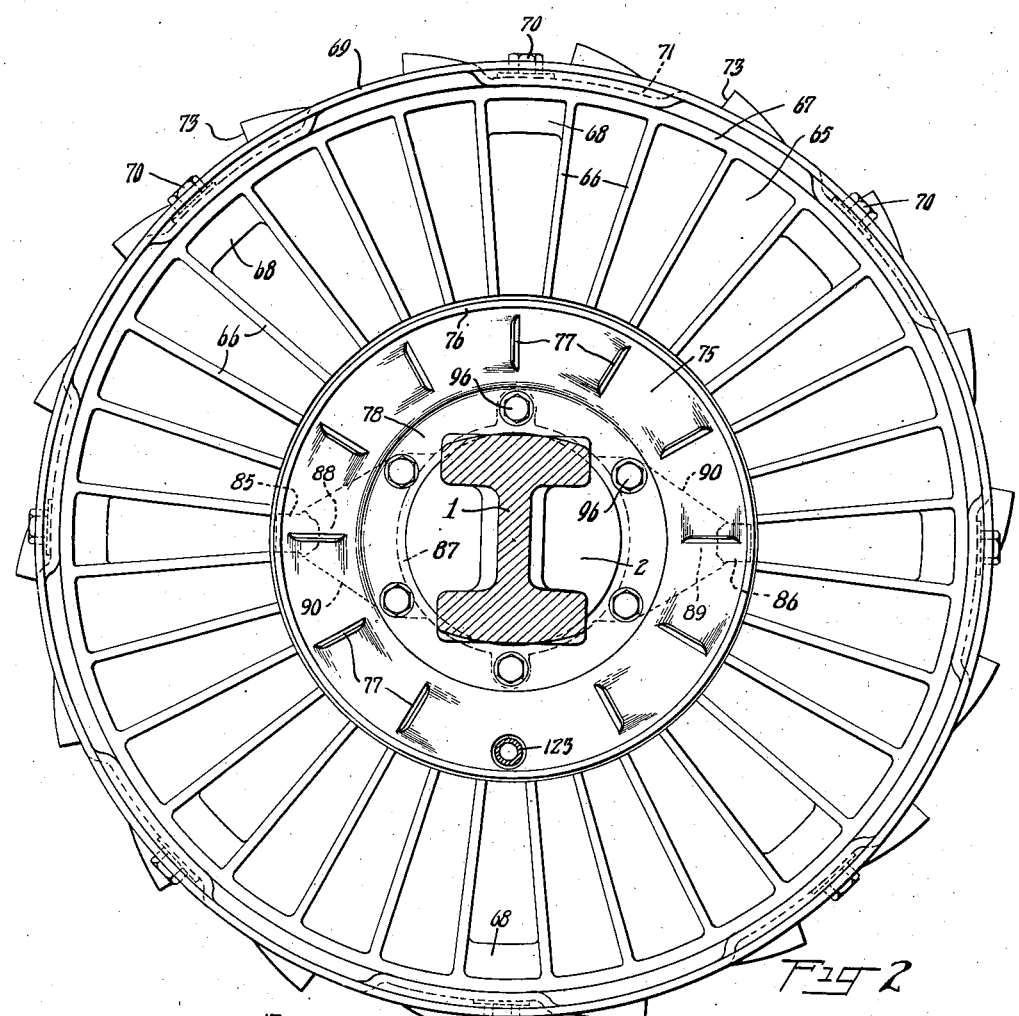
Fig. 2 is a section taken along the line 2—2 of Fig. 1 showing details of the braking and brake-cooling mechanism.

Objects of the present invention are to provide simple, separate, compact, powerful and uniformly-acting braking mechanisms, particularly applicable to and useful with dual wheel assemblies, especially those having independently rotatable wheels of relatively small diameter; to provide braking mechanism for the purpose aforesaid embodying brake shoes and co-acting braking surfaces of the annular flat type to the end that the braking or retarding pressures will not be localized, or unequally applied, but will be distributed substantially uniformly over the whole flat braking surface with a consequent generation of less heat; to provide a maximum amount of braking surface in a minimum space; to provide for smooth, easy operating, balanced braking action, having a definite application to each wheel, and capable of exerting a braking pressure sufficiently powerful to lock the wheels if so desired; to provide a powerful brake mechanism which may be directly operated by compressed air at normal and relatively moderate pressure; to provide for simple, direct and balanced application of the braking force to the brake shoes and braking surfaces and preferably concurrently, equally and directly thereto from between opposed annular flat brake shoes to effect balanced transmission of the braking effort to corresponding flat annular braking surfaces on a pair of dual wheels; to provide for effectively cooling the braking mechanism and for preventing the flow of heat generated thereby into parts of the wheel assembly which would be adversely affected by high temperatures; and, to provide for convenience and facility in adjusting the braking mechanism to compensate for wear.

To this end, as at present preferably embodied and as applied to a dual wheel assembly, dual wheels are mounted for independent rotation on a spindle at either end of an axle beam. Two annular brakeshoe members in spaced parallel relationship are vertically mounted in concentric relation with the spindle axis, the members being of such inner diameter as to provide an annular air space between their inner cylindrical surfaces and the periphery of the spindle to the end that cooling air may have substantially free access to the space between the members. The brake-shoe members have flat annular braking surfaces and are movable axially, but not angularly, apart from each other, against spring tension to effect friction engagement of their braking surfaces with corresponding flat annular braking surfaces on the dual wheels, the movement being effected by expansible brake-shoe actuating devices energized by fluid pressure which are interposed between the brake shoe members in spaced relation at angularly balanced sites so that substantial freedom of movement of cooling air outwardly between the brake-shoe members is obtainable. The braking surfaces on the dual wheels constitute a peripheral portion of a pair of annular brake members, one of which in adjustable association with one of the dual wheels forms a louvered jacket or casing encompassing and enclosing in substantial measure the other brake member, the brake-shoe members and the brake-shoe actuating devices and effective upon normal rotation to cause air to move over its surfaces and course its interior in considerable volume and at a velocity and with conditions of turbulence sufficient to ensure a marked cooling through abstraction of heat from the brake mechanism. Flow of heat at a harmful rate from the enclosed brake member into the wheel bearings is reduced and substantially eliminated under any conditions of operation through the provision of suitable heat insulating material between these elements.

It will be understood that the following general description, and the detailed description as well, are exemplary and explanatory, but are not restrictive of the invention.

Referring now in detail to the embodiment of the invention illustrated by way of example in the accompanying drawings, an axle beam 1 of center I-section is shown having dual wheels mounted upon the spindle 2 on either end thereof.

The side by side pair of dual wheels are rotatably mounted on the spindle 2 to have free rotation with respect to the spindle and with respect to each other, broad and ample bearings being provided for each wheel hub within relatively compact dimensions. As embodied, each of the wheels has its hub of ample width and diameter, one of the hubs being nested within the other, suitable antifriction bearings and lubricating facilities being provided to meet adequately the needs and requirements of heavy duty vehicles. As here embodied, roller bearings 10 and 11 are mounted in well spaced apart relation on the spindle 2, the hub 12 of the outboard wheel being journalled on these bearings. Bearing 10 is held axially in position by the inner side of its inner raceway abutting on a collar 13 shrunk or otherwise fixed on spindle 2 contiguous to the shoulder 3, the outer side of the outer raceway of bearing 10 abutting on an inwardly projecting flange 14, formed on the interior of the hub 12. Bearing 11 is held in position axially by the inner side of its outer raceway abutting on an inwardly projecting flange 15 formed on the interior of the hub 12, the outer side of its inner raceway abutting on a nut 16 screw threaded on the outer end of spindle 2.

The hub 17 of the inboard wheel is journalled on hub 12 of the outboard wheel, for the greater part of its extent, thereby providing an ample bearing for the inboard wheel, anti-friction bushings 18 and 19 being interposed between the finished surfaces of the two hubs. Thrust-bearing washers 20 and 21, located at either end of hub 17, take up end thrusts between the two wheels.

The outboard wheel, as embodied, comprises a dished web 25, having an inner flat annular portion 26 abutting on the flat annular face of its hub 12. The web 25 is fastened to the hub by screw bolts 27 passing through the flat portion 26 of the web and screw threaded into the hub.

The embodied rim supporting means comprises a series of circumferentially arranged, spaced apart apertures in an outer flat annular peripheral portion 28 of web 25 of the wheel, through which apertures extend screw threaded bolts 29 having hooked heads 30. Apertured lugs 31, which are fixed to a tire rim 32, are supported on the bolts 29, and are held in fixed position by nuts 33, which clamp the lugs between the annular flat portion 28 and the nuts to hold the rim in position upon the wheel.

The inboard wheel, as embodied, comprises a dished web 35 having at least one opening 36 therein and having a flat annular inner portion 37 that fits closely over the exterior of its hub 17 with its inner face abutting against the outer face of an annular outwardly extending flange 38 integral with the hub 17, and fastened thereto by screw bolts 39. The embodied rim supporting means of the inboard wheel likewise comprises a series of circumferentially arranged spaced apart apertures in a flat annular outer portion 40 of the web 35, in which apertures are bolts 41 having hook heads 42 on their inner ends. Apertured lugs 43 are affixed to a wheel rim 44, are supported on the bolts 41 and are held in place by nuts 45 which clamp the lugs between the flat portion 40 and the nuts to hold the rim in position upon the wheel.

In order to prevent leakage of lubricant from around the thrust bearings 20 and 21, suitable sealing devices are employed. As embodied, a sealing gasket 46 of a known type encircles the outwardly extending annular flange 47 of the hub 12 and sealingly engages the annular flange 38 of the hub 17. Similarly, a sealing gasket 48 encircles the outwardly extending annular flange 49 of the hub 17 and sealingly engages the axially extending annular flange 50 of the wheel web 25. A cap 51 tightly covers the spindle end and is fastened to the wheel web 25 by the tap screws 52.

The braking system is characterized by the combination of a pair of annular brake shoe members positioned in operable relation to, between and concentric with a pair of annular brake members, the whole being so constructed and arranged as to be cooled in an effective manner by movement of the wheel assembly. As embodied, the brake shoe members are secured to the spindle so as to permit axial movement but prevent angular movement and are adapted to be forced apart against spring pressure by fluid pressure applied at angularly balanced areas into balanced engagement with the brake members. One of the brake members is adjustably supported on one of the wheels and forms therewith a casing or enclosure for the brake shoes and the other brake member adapted to promote circulation of cooling air over the braking system upon movement of the wheel assembly.

As here embodied, a dished annular brake member 55 having radially extending reinforcing and cooling fins 56 and 57 on its inner and outer faces, respectively, is supported upon the outer wheel hub 12 co-axially with the spindle axis and forms with the collar 13 a seal for preventing leakage of lubricant from the wheel bearings into the brake mechanism. A flat annular portion 58 of the brake member provides a recessed seat for the inner face of the annular flange 47 of wheel hub 12, a flat annular gasket 59 of known or suitable heat insulating material being interposed between the opposed surfaces. Screw bolts 60 secure the brake member and wheel hub to each other. Packing material 61 carried by the brake member in an annular recess in the inner cylindrical surface of the brake member seals the space between the brake member and collar 13 against passage of lubricant therethrough. A number of ventilating openings 62 in the dished portion of the brake member allow for the passage of cooling air from the inner to the outer face of the brake member.

Figure 3:
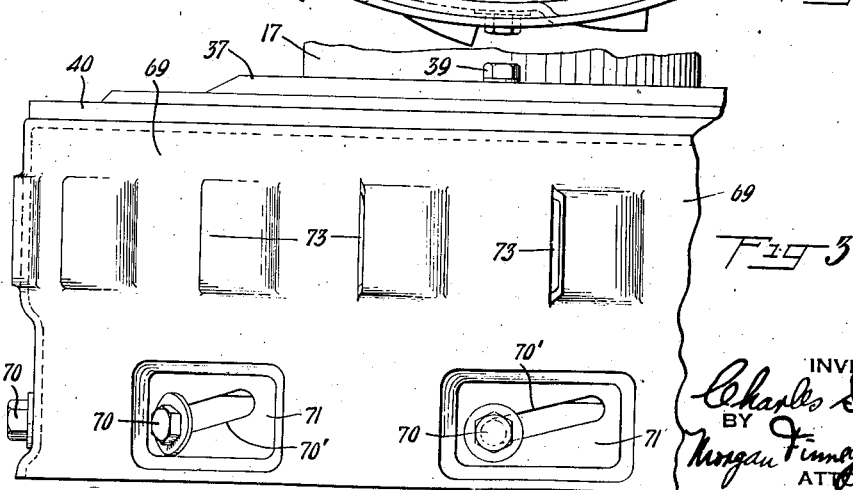
Fig. 3 is a fragmentary plan view of details of the brake-cooling and adjusting mechanism.

An annular brake member 65 having radially extending cooling and reinforcing fins 66 on its outer surface is supported at its outer rim from the inner wheel in spaced concentric relation to the brake member 55. As here embodied, the brake member 65 is provided with a horizontally extending annular flange 67 from which extend radially inwardly at angularly balanced areas the bolt seats 68. A casing member 69 cylindrical in contour surrounds the brake member 65 to which it is adjustably secured by screw bolts 70 received within the bolt seats 68. The casing member is spaced from the flange 67 substantially throughout its circumference save at the bolting areas where the casing member is deformed to provide slotted recessed portions 71 seating on the flange 67. The slot 70' in each of the recessed portions 71 is inclined as best shown in Fig. 3 so that relative angular movement of the brake member 65 and the casing member 69 will produce relative axial movement of these members for effecting manual brake adjustment to compensate for wear of the braking surfaces. The casing member 69 (and the brake member 65 in turn) is carried by the inboard wheel for rotation therewith, being secured thereto by means of a radially extending annular apertured flange 72 of the casing member seated in a recess formed in the inner face of the flat annular portion 40 of the wheel web 35. The flange 72 being firmly clamped and held between the bolt heads 42 and the annular portion 40. A series of louvers 73 arranged about the circumferential periphery of the casing member 69 provide ports through which cooling air may issue after passage under the influence of centrifugal force through the space enclosed by the casing member and about the brake mechanism and brake surfaces therein.

Cooling air enters the space enclosed by the casing member through the opening 36 in the inboard wheel and through the annular space between the brake member 65 and the spindle 2. As embodied, this annular space is provided with means for directing the flow of cooling air thereinto in the form of an annular member 75 fixed therein. As here embodied, the annular member 75 is formed with a horizontally extending annular flange 76 circumferentially thereof which provides a measure of stiffness thereto and a semi-sealing closure therefor effective to reduce in some measure the free entry of dirt, water and other foreign matter while louvres 77 allow the relatively free passage of cooling air through the annular member 75 to the braking surfaces. A flat annular portion 78 of the annular member 75 is apertured at arcuately spaced areas for the passage of fastening means by which it is securely held in position as will be described more fully hereinafter.

Non-rotating brake shoe members in concentric parallel relation to the brake members 55 and 65 are supported therebetween for axial movement into engagement therewith. As embodied, annular brake shoe members 81 and 82 having annular and radial cooling reinforcing fins 83 and 84, respectively, are slidably mounted through a tongue and groove arrangement upon the oppositely extending horizontal radial arms 85 and 86 of a sleeve 87 coaxial with and firmly secured against angular or axial movement relative to the spindle 2. These arms are apertured as at 88 and 89 respectively to permit the flow of cooling air therethrough and are stiffened by suitable gusset members 90. Each arm forms a tongue fitting within one of a pair of diametrically opposed grooved runways 91 on each of the brake shoe members for which stiffening ribs 92 are provided. Limited opposed axial movement of the brake shoe mmebers into and out of engagement with brake members 65 and 55 is thus provided for, the brake shoe members and the brake members being formed or provided with corresponding flat annular braking or friction surfaces adapted to provide a smooth powerful braking action.

The sleeve 87 is provided at its inner end with an outwardly extending annular flange 95 whose inner face is recessed to provide a seat for the annular louvred closure member 75 which is fastened thereto by screw bolts 96. The sleeve 87 is formed with a groove 97 at its outer end into which extends a dished annular member 98 forming a guard ring or seal adapted to prevent the flow of lubricant from the wheel bearings to the braking surfaces. The member 98 is formed with a flat annular apertured portion 99 secured between the bolts 60 and the inner face of the flat annular portion 58 of the brake member 55.

The brake shoe members are normally held in disengaged relationship to the brake members by springs 101 or other suitable restoring means fastened thereto and therebetween and are adapted to be forced apart axially uniformly into balanced braking engagement with the braking members by fluid pressure applied at angularly balanced areas through the medium of expansible containers 104 interposed between the brake shoe members in angularly balanced spaced apart relationship so as to provide passageways for the flow of cooling air between the brake shoe members. As embodied, each expansible container is formed by a pair of rigid elements 105 and 106 flexibly coupled perimetrically by a gasket 107 of rubber or other suitable flexible, resilient material so as to provide a chamber of variable volumetric capacity adapted to be supplied at will with fluid under pressure. As here embodied, the elements 105 and 106 are of generally circular contour, are slightly dished in cross-section and are normally nested in each other with their contiguous faces slightly spaced from each other throughout the greater portion of the opposed surface area by the abutment 108, thus providing a minimum volumetric capacity adapted to be provided at all times with pressure fluid. The element 106 is formed with an annular flange 109 concentric therewith and annularly spaced from the element 105, the flange 109 at its inner cylindrical face being recessed to provide an annular groove in which the gasket 107 is lodged through its outer edge. A dished annular cap 110 seated throughout its rim upon the flange 109 is formed with an annular flange 111 which fitting into the annular space between flange 109 and the rim of the element 105 presses upon the gasket 107 thereby to fix the latter securely in position between it and the element 106 through the medium of the screw bolts 112 passing through apertures in the element 105 into the flange 109. The construction thus provided is adequate to seal the joint between the elements 105 and 106 and to prevent dislodgment of the gasket 107 whose projecting portion is lodged in an annular recess on the inner face of the element 105 to which it is bonded so as to provide a leak-proof joint. The elements 105 and 106 respectively are formed with oppositely extending bosses 115 and 116 respectively lodged in sockets 117 formed in the inner faces of the brake shoe members 81 and 82 at angularly balanced areas, the boss 115 extending through the central opening of the annular cap 110 which is circumscribed by a reinforcing and guiding flange 118 for ensuring linear opposed axial movement of the elements 105 and 106.

Pipes 120 for conducting pressure fluid connect the containers 104 with each other and with a header 121 mounted upon and secured to the brake shoe member 81 by screw bolts 122, the header 121 being connected in turn by a pipe 123 passing through an aperture in the dust plate 75 to a pressure fluid supply source such as the master cylinder of the brake actuating system. The pipes 120 are connected to the containers 104 in such fashion by suitable fittings 124 as to unite the respective chambers between the flexibly coupled elements 105 and 106 into a continuous fluid circuit wherein the fluid pressure is uniform. The containers 104 are preferably alternately reversed in so far as is possible with the uneven member as here embodied. By this arrangement, the fittings 124 and the pipes 120 are not all located at one side of the medial vertical plane of the containers and less obstruction to the free flow of cooling air between the brake shoe members is realized.

Thus, it will be observed that as the wheels rotate, the brake members 55 and 65 rotate therewith. In consequence, the air trapped within the casing 69 is caused to rotate and is caused to flow outwardly by centrifugal force in the path generally shown by the arrows in Fig. 1 thereby effectively cooling the braking mechanism. Further, it will be observed that this result is obtained by, among other things, the novel arrangement and construction of the brake shoe member actuating mechanism wherein and whereby a balanced uniform braking action is obtainable in a dual wheel assembly in combination with effective cooling action.

The invention in its broader aspects is not limited to the specific mechanisms shown and described but departures may be made therefrom within the scope of the accompanying claims without departing from the principles of the invention and without sacrificing its chief advantages.

What I claim is:

1. In a dual wheel assembly, a pair of wheels mounted in side by side relationship for independent rotation; a pair of annular brake members supported by said wheels concentrically therewith and in variable parallel spaced relation to each other; a pair of annular brake-shoe members mounted between said brake members concentrically therewith and in variable parallel spaced relation to each other, each providing an opening for the flow of cooling air about elements of the braking system; and, means actuable by fluid pressure for moving said brake-shoe members into braking engagement with said brake members; said means comprising pairs of flexibly connected rigid members, each said pair being disposed between said brake-shoe members in angularly balanced spaced relation to each other whereby cooling air may flow between said brake-shoe members and a balanced uniform braking action may be obtained.

2. In a dual wheel assembly, an axle member; a pair of wheels mounted thereon in side by side relation for independent rotation; a pair of annular brake members supported by said wheels concentrically therewith and in variable parallel spaced relation to each other; means for minimizing the flow of heat from one of said brake members to its supporting wheel; a pair of annular brake-shoe members positioned between said brake members concentrically therewith and in variable parallel spaced relation to each other, each providing an opening for the flow of cooling air about elements of the braking system; means secured to said axle member slidably engaging said brake-shoe members and securing said brake-shoe members against angular movement; and, means actuable by fluid pressure for moving said brake-shoe members into braking engagement with said brake members; said means comprising pairs of flexibly connected rigid members, each said pair being disposed between said brake-shoe members in angularly balanced spaced relation to each other whereby cooling air may flow between said brake-shoe members and a balanced uniform braking action may be obtained.

3. In a dual wheel assembly, an axle member; a pair of wheels mounted on said axle member in side by side relation to each other; a pair of annular brake members supported by said wheels concentrically therewith and in axially variable parallel spaced relation to each other; a pair of annular brake-shoe members mounted between said brake members concentrically therewith and in axially variable parallel spaced relation to each other, each providing an opening for the flow of cooling air about elements of the braking system; means secured to said axle member slidably engaging said brake-shoe members and securing said brake-shoe members against angular movement; and, means actuable by fluid pressure for moving said brake-shoe members into braking engagement with said brake members; said means comprising pairs of flexibly connected rigid members, each said pair being disposed between said brake-shoe members in angularly balanced spaced relation to each other whereby cooling air may flow between said brake-shoe members and a balanced uniform braking action may be obtained.

4. In a dual wheel assembly, a pair of side by side dual wheels mounted for independent rotation; a pair of annular brake members mounted in parallel spaced relation on said pair of wheels, unit to unit, said brake members respectively having a flat annular braking surface concentric with said wheels; a pair of annular brake-shoe members mounted between said brake members in variable parallel spaced relation, said brake-shoe members respectively having a flat annular braking surface concentric with said wheels; containers expansible by fluid pressure supported in angularly balanced spaced relation between and by said brake-shoe members; said containers comprising respectively a pair of nested rigid members flexibly connected to each other, said members respectively having a boss extending outwardly therefrom in axial alignment with the boss of the other unit of said pair into a recess in a unit of said pair of brake-shoe members, a cap secured to one of said rigid members, said cap having an opening through which extends the boss of the other of said members; resilient means connecting said brake-shoe members to each other; and, means for supplying fluid under pressure to said containers.

5. In a dual wheel assembly, a pair of side by side dual wheels mounted for independent rotation; a louvered annular brake member secured to one of said wheels; a louvered casing forming member secured to the other of said wheels and providing therewith an enclosure containing said brake member; an annular brake member adjustably mounted on said casing member and providing an opening for the flow of cooling air into and through said enclosure; a pair of annular brake-shoe members situated in spaced relation between said brake members within said enclosure; and, means for applying a braking effort to said brake-shoe members, comprising containers expansible by fluid pressure supported in angularly balanced spaced relation between and by said brake-shoe members.

6. In a dual wheel assembly, an axle member; a pair of side by side dual wheels mounted thereon for independent rotation; an annular brake member secured to one of said wheels; an annular brake member secured to the other of said wheels; a pair of annular brake-shoe members secured to said axle member in spaced relation thereto between said brake members; and, means for moving said brake-shoe members axially into braking engagement with said brake members comprising containers expansible by fluid pressure supported in angularly balanced spaced relation between and by said brake-shoe members.

7. In a dual wheel assembly, an axle member; a pair of side by side dual wheels mounted thereon for independent rotation; an annular brake member secured to one of said wheels concentrically therewith, said brake member having cooling fins on its outer face, an annular braking surface on its inner face and apertures for the passage of cooling air between said faces; a louvered casing member of cylindrical contour secured to the other of said wheels concentrically therewith, said casing member having bolting slots whose longitudinal medial planes respectively intersect the axis plane of said axle member; an annular brake member nested in said casing member and releasably secured thereto in manually axially variable relation by bolts passing through said slots, said annular brake member having cooling fins on its outer face and an annular braking surface on its inner face and forming with said axle member an annular space for the passage of cooling air into the space enclosed by said casing member; a sleeve fixed to said axle member, said sleeve having oppositely extending apertured radial arms; a pair of annular brake shoe members slidably mounted on said arms between said brake members for axial movement relative thereto, said brake shoe members respectively having cooling fins on the inner face thereof, an annular braking surface on the outer face thereof and forming with said axle member a space substantially annular in contour from which cooling air may flow outwardly between said brake shoe members to and through the louvers in said casing member; and, means for moving said brake-shoe members axially to effect engagement of the opposed braking surfaces comprising containers expansible by fluid pressure supported in angularly balanced spaced relation between and by said brake-shoe members.

8. In a dual wheel assembly, a pair of wheels in side by side relation; and, a pair of brake members in spaced relation to each other rotatable with said wheels, the brake members being connected separately to the wheels one of said brake members being movable helically to vary the spacing between said brake members.

9. In a dual wheel assembly, a pair of wheels mounted in side by side relation to each other for independent rotation; a brake member on either wheel rotatable therewith, said brake members being in spaced relation to each other and one of said brake members being movable helically to vary the spacing between said brake members.

10. In a dual wheel assembly, a pair of wheels mounted in side by side relation to each other for independent rotation; and, an annular brake member mounted on either wheel in concentric relation thereto for rotation therewith, said brake members being in parallel spaced relation to each other and one of said brake members being angularly adjustable in its mounting whereby the spacing between said brake members may be varied.

11. In a dual wheel assembly, a pair of wheels mounted for rotation in side by side relation to each other; an annular brake member mounted on either of said wheels in concentric relation thereto for rotation therewith, said brake members being in concentric parallel spaced relation to each other and one of said brake members being angularly displaceable relative to its wheel; and, means including a helical slot for causing linear axial movement of said last mentioned brake member in response to such relative angular displacement.

12. In a dual wheel assembly, a pair of wheels in side by side relation; and a pair of brake members in spaced relation to each other rotatable with said wheels and independently connected to their respective wheels, one of said brake members being axially movable to vary the spacing between the brake members, and friction means between the brake members for engaging the brake members to brake the wheels, said friction means being held against rotational movement and being mounted for limited axial movement whereby the pressure against the brake members is equalized.

13. In a dual wheel assembly, a pair of wheels in side by side relation; and a pair of brake members in spaced relation to each other rotatable with said wheels and independently connected to their respective wheels, and friction means between the brake members for engaging the brake members to brake the wheels, said friction means being held against rotational movement and being mounted for limited axial movement whereby the pressure against the brake members is equalized.

CHARLES S. ASH.